United States Patent

Elliott

[15] 3,662,290

[45] May 9, 1972

[54] AUTOMATIC CONTROL FOR AMPLITUDE-MODULATED SIGNAL SOURCE

[72] Inventor: William S. Elliott, Cedar Rapids, Iowa

[73] Assignee: Collins Radio Company, Cedar Rapids, Iowa

[22] Filed: Aug. 5, 1970

[21] Appl. No.: 61,132

[52] U.S. Cl. ................................332/38, 325/404, 325/408, 328/168, 329/178, 330/140

[51] Int. Cl. ..........................................................H03c 1/00

[58] Field of Search .....................332/37, 37 D, 38, 31, 31 T; 325/404, 405, 408, 409; 330/133, 134, 138, 139, 140; 328/168; 329/178, 192

[56] References Cited

UNITED STATES PATENTS

| | | | |
|---|---|---|---|
| 3,566,276 | 2/1971 | Finkel | 325/404 X |
| 3,162,801 | 12/1964 | Bogotch et al. | 325/408 X |
| 3,200,336 | 8/1965 | Valakos et al. | 332/37 X |
| 3,394,315 | 7/1968 | Gray | 325/404 |
| 3,428,909 | 2/1969 | Kam et al. | 330/140 X |

*Primary Examiner*—Alfred L. Brody
*Attorney*—Richard W. Anderson and Robert J. Crawford

[57] ABSTRACT

An automatic level control maintains an accurate output level measurement under conditions of high modulation index by developing a control signal proportional to the deviation of output level from a desired norm. Output level is determined as a function of the time that the modulation envelope thereof exceeds a predetermined threshold. The control is independent of distortions in recovered modulation envelope waveform introduced by conventional envelope detectors due to diode offset voltage and/or high modulation index and permits independent application of carrier level and modulation index controls.

6 Claims, 4 Drawing Figures

Figure 1:
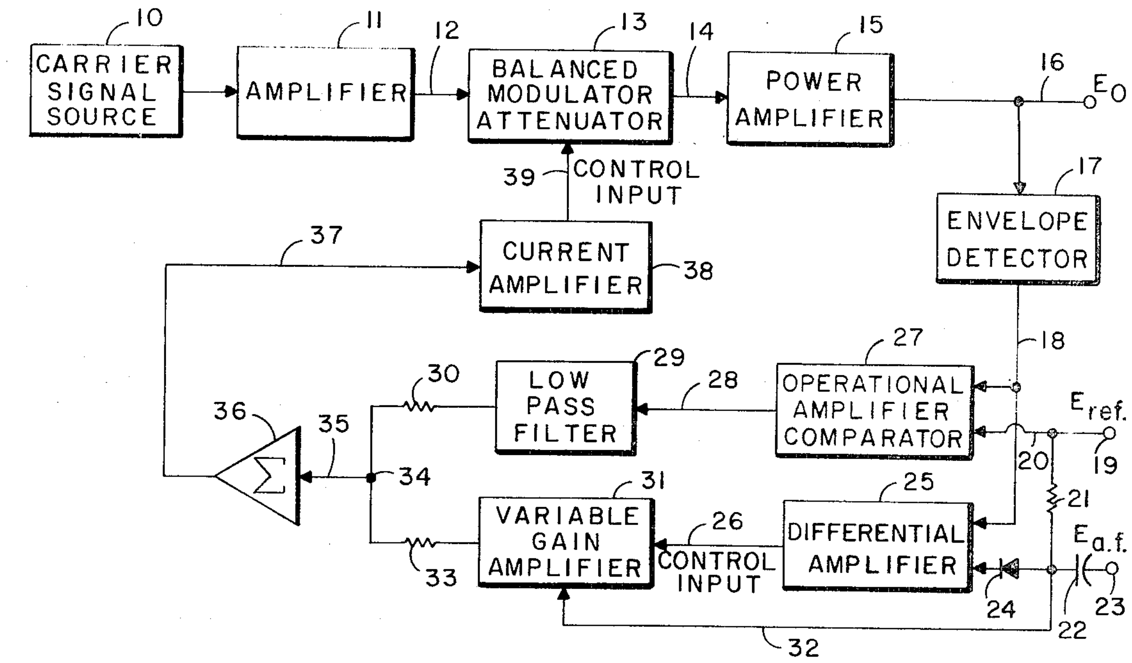

INVENTOR.
WILLIAM S. ELLIOTT
BY R. W. Anderson
AGENT

AUTOMATIC CONTROL FOR AMPLITUDE-MODULATED SIGNAL SOURCE

This invention relates generally to automatic level control (ALC) and more particularly to an improved automatic level control for an amplitude-modulated radio frequency (rf) signal source that must provide a constant carrier power level essentially independent of modulation index and circuit variables over a large frequency range.

ALC for amplitude-modulated sources is normally accomplished by connecting an envelope detector to the output of the modulated rf signal source, comparing the average (direct current) voltage level of the envelope detector output with a reference voltage, and, with suitable negative feedback, providing corrective control of the total output. For an unmodulated rf signal or for modulated rf signals with small modulation indices, the solution is satisfactory. However, high modulation indices may cause the ALC to over-correct due to the characteristics of the envelope detector. The envelope detector employs a semi-conductor diode as a rectifying element, therefore, the output voltage produced by the envelope detector differs from the true peak levels of the input rf signal by the magnitude of the offset (or threshold) voltage in the semi-conductor diode. Further, under conditions of very high modulation indices, the "valley" of the amplitude-modulated envelope may be below the magnitude of the offset voltage of the diode to the extent that the output of the semi-conductor diode will cease to conduct and the envelope detector output will drop to zero and will not follow the amplitude-modulated envelope. The average value of the resulting distorted envelope wave varies with this degree of distortion and suffers accordingly as a true reference.

Accordingly the object of the present invention is the provision of an automatic level control circuit which is independent of the amplitude modulating signal waveform provided the time average of amplitude modulating signal waveform is zero; that is, the modulation waveform may have any shape provided its zero crossings are periodic.

A further object of the present invention is the provision of an automatic level control circuit which is independent of the magnitude of the offset voltage introduced by a semi-conductor diode employed in the envelope detector portion of the circuitry.

A still further object of the present invention is the provision of an improved automatic level control for an amplitude-modulated signal by means of which the carrier level and the amplitude modulation index controls may be applied independently.

The present invention is featured in the comparison of the instantaneous value of the output of an envelope modulation detector to a direct current voltage reference which has been adjusted to correspond to the desired peak amplitude of the carrier signal without modulation. The output of the comparator is a voltage that is present on the basis of the time the envelope exceeds the reference peak voltage. The average voltage level of the comparator output is thereby directly proportional to the magnitude of the signal source carrier level relative to the DC voltage reference may be utilized to provide level sensitive feedback to control the output level of an applied modulated carrier signal source. The control is unimpaired by large modulation indices which would otherwise introduce detector threshold dependent distortions.

Figure 2A:
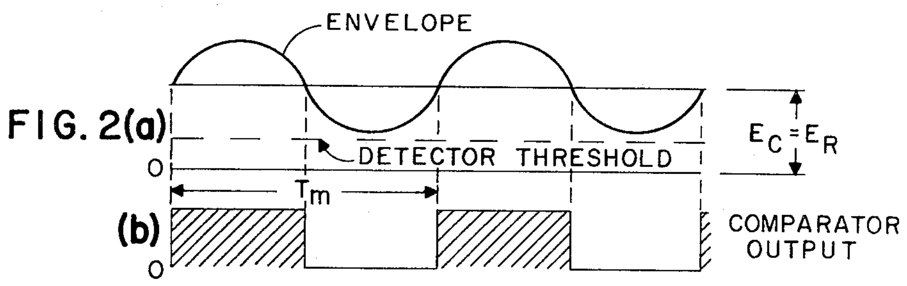
Figure 3A:
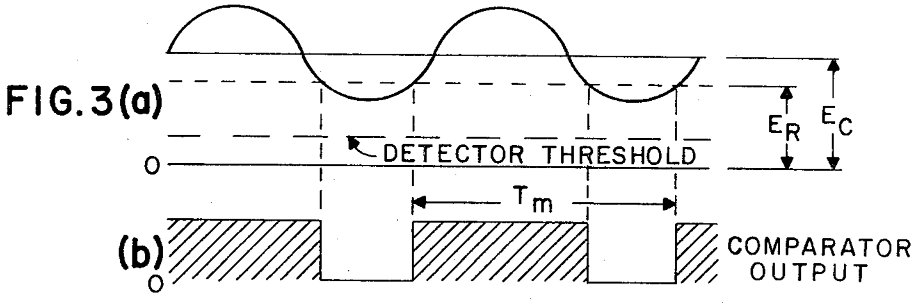
Figure 4A:
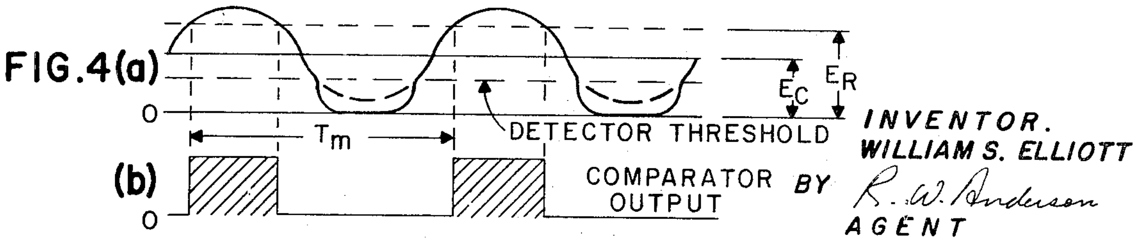

These and other features and objects of the present invention will become apparent upon reading the following description with reference to the accompanying drawings in which;

FIG. 1 is a block diagram of an automatic level control for an amplitude-modulated source in accordance with the present invention; and FIGS. 2, 3, and 4 are diagrammatic representations of illustrative operational waveforms depicting the output of the comparator employed in the present invention under conditions of applied carrier peak voltage respectively equaling, being greater than, and being less than the peak level of the applied carrier.

With reference to FIG. 1, a carrier signal source 10 is applied through a gain-controlled signal translating means to the output line 16. In the embodiment depicted, the carrier signal source 10 is applied through an amplifier 11 the output 12 of which is applied to a balanced modulator attenuator 13. The balanced modulator attenuator 13 functions as a variable gain member by means of which the level of signal source output from the attenuator on line 14 may be controlled for application to a power amplifier 15. In a general sense, the gain-controlled signal translating means, herein embodied as a balanced modulator attenuator 13, is inserted between the signal source amplifier 11 and the final power amplifier 15. The output of the power amplifier 15 is linear with respect to its input 14; therefore, output level control is accomplished by applying feedback to the balanced modulator attenuator 13. In a general sense for the purpose of this invention, the balanced modulator attenuator 13 might generally be defined as a gain-controlled signal translator responsive to a control input signal to vary the level of signal applied thereto from amplifier 11 for application to the output power amplifier 15.

An envelope detector 17 receives the output signal 16 from power amplifier 15 and develops an output 18 corresponding to the modulation envelope of the output signal. The output 18 from envelope detector 17 is applied to a comparison means 27 which forms a part of a control loop for varying the amount of attenuation or gain, hence level, of the signal applied to power amplifier 15.

In known automatic level control systems the output of the envelope detector 17 would be filtered to produce a DC component proportional to the carrier peak amplitude and this peak amplitude signal compared to a reference for level control. By contradistinction, in the circuit of the present invention, the demodulated signal, as it appears at the output 18 of envelope detector 17, is not filtered (except for the inherent carrier frequency filtering of envelope detection per se) and the envelope detector output 18 is a reproduction of the modulating signal. The output 18 from the envelope detector 17 is applied as a first input to a comparison circuit 27 which compares the instantaneous value of the envelope detector output 18 to a direct current voltage reference 19 applied as a second input to comparator 27 on line 20.

Comparator 27 might comprise a high gain operational amplifier the output of which is saturated in the positive direction whenever the envelope signal as applied on line 18 exceeds the DC reference voltage applied on line 20. The output of the operational amplifier 27 is zero whenever the envelope signal is less than the direct current voltage reference 19 applied on line 20. Thus comparator 27 might comprise a known operational amplifier implementation to provide the aforedefined output response. The output of comparator 27, as will be further described, then becomes a rectangular wave with a period equal to the period of the modulating frequency in the system and with leading and trailing edges corresponding to zero-differential voltage between the detector envelope signal as it appears on line 18 and the reference direct current voltage 19 as it appears on line 20. This operation is depicted in the simplified operational waveforms of FIGS. 2, 3, and 4.

Referring to FIG. 2, waveform (*a*), the envelope of the output signal 16 is depicted as a sinusoidal variation of predetermined frequency about its axis of symmetry which comprises the carrier level. As depicted in FIG. 2, waveform (*a*), the carrier level peak, $E_c$, is equal to the direct current voltage reference 19, depicted as $E_R$. In response to this situation the operational amplifier comprising the comparator 27 is saturated during periods of time equal to the time periods during which $E_c$ exceeds $E_R$. Comparator 27 produces an output depicted in FIG. 2, waveform (b), as a positive square wave the leading and trailing edges of which are defined by the periods of time during which the envelope signals 18 is in excess of carrier reference signal $E_R$.

If the output of the signal source is increased so that the average peak carrier level exceeds the DC reference voltage 19, the situation of FIG. 3 exists. With reference to FIG. 3, waveform (*a*), note that $E_c$ carrier peak average exceeds the reference $E_R$ applied on line 19. Note with reference to FIG. 3, waveform (*b*), that the time duration during which comparator 27 is saturated is longer than the time duration in which the output is zero.

Similarly if the signal source output is low with respect to the voltage reference $E_R$, the situation depicted in FIG. 4, waveform (*a*), exists, and the time periods during which the output from comparator 27 is saturated are less than those during which it is zero.

The average level of the output of comparator 27 is thus seen to be directly proportional to the magnitude of the signal source carrier level relative to the direct current voltage reference 19 and accordingly may be employed to provide level-sensitive feedback to control the output level. For small deviations of signal level, the proportionality is essentially linear.

Thus the output from comparator 27, as it appears on line 28, is applied to a low-pass filter 29 to provide a direct current voltage signal for control. The output from low-pass filter 29, with reference to FIG. 1, is applied to a summing amplifier 36. As will be further described, a second input to summing amplifier 36 comprises the amplitude modulating signal of the system. For the moment, considering only the input to summing amplifier 36 from filter 29, summing amplifier 36 provides an output 37 which is utilized for controlling the gain-controlled signal translating means embodied in FIG. 1 as current amplifier 38 and balanced modulator attenuator 13. The output from summing amplifier 36 is applied to current amplifier 38 the output 39 of which is applied to the control input to balanced modulator attenuator 13. Since the output of the comparator 27 is a function of only the polarity of the voltage differential between the detector envelope and the direct current voltage 19, the modulating waveform is thus seen to have no wave shape limitation as concerns system operability other than that its zero crossings be periodic.

The threshold level intrinsic to envelope detector 17 is shown in the operational waveforms of FIGS. 2, 3, and 4. Note that the high modulation index depicted in FIG. 4, waveform (*a*), results in the "valleys" of the modulation envelope falling beneath the threshold; however, the control is not effected since the comparator output is based on the relative periods of time during which the modulation envelope exceeds the carrier reference. A control based on averaging the envelope signal to determine level would be detrimentally affected by high modulation index situations as depicted in FIG. 4. The envelope detector would introduce distortion not actually present in the amplitude modulation waveform.

An amplitude modulator is incorporated into the circuitry of FIG. 1 by feeding the modulating frequency $E_{af}$ from terminal 23 through a coupling capacitor 22 and diode member 24 as first input to a differential amplifier 25. The output 18 from envelope detector 17 is applied as a second input to differential amplifier 25. The differential amplifier 25 compares the two signal inputs applied and develops an output 26 as a controlling signal for a variable gain amplifier 31 to which the modulating signal 23 is applied through line 32. The output from variable gain amplifier 31 is mixed with the carrier level control signal from low-pass filter 29 at the junction 34 between coupling resistors 30 and 33 to provide a composite control signal 35 for application to summing amplifier 36.

Summing amplifier 36 develops an output 37 which is a combination of the DC and AC components of the reference signals for control of current amplifier 38 which in turn controls balanced modulator attenuator 13 to control the output level.

The diode member 24 through which the modulating frequency 23 is applied to differential amplifier 25 is chosen to exhibit an offset voltage characteristic corresponding to the threshold level intrinsic to envelope detector to compensate the problem of offset voltage in the envelope detector 17.

Although the present invention has been described with respect to a particular embodiment thereof, it is not to be so limited as changes might be made therein which fall within the scope of the invention as defined in the appended claims.

I claim:

1. An automatic level control comprising gain-controlled signal translating means through which a carrier signal is passed to an output terminal, envelope detection means connected to said output terminal and developing an output signal corresponding to the instantaneous amplitude level of the input signal thereto, signal comparison means, a reference signal source corresponding to a desired peak carrier level applied as a first input to said signal comparison means, the output from said envelope detection means applied as a second input to said signal comparison means, said signal comparison means being adapted to provide an output signal the average value of which is proportional to the relative time periods during which the output from said envelope detector exceeds said carrier level reference source, and means responsive to the output from said signal comparison means to control the gain of said gain-controlled signal translating means, whereby the carrier level of the output from said gain-controlled signal translating means is maintained at a level as set by said reference signal source.

2. A level control as defined in claim 1 wherein said signal comparison means comprises an operational amplifier receiving the output from said envelope detector, said operational amplifier being adapted to produce a saturated output in a positive direction during said time periods when the output from said envelope detector exceeds that of said reference signal source and a zero output during the periods of time when the output from said envelope detector is less than said reference signal source, averaging means receiving the output from said operational amplifier, and the output of said averaging means applied to said gain-controlled signal translating means.

3. A level control as defined in claim 1 further comprising a source of modulating signal, differential amplifier means, said source of modulating signal and the output of said envelope detector being applied as respective first and second inputs to said different amplifier means, a variable gain amplifier, said modulating signal source being applied to the input of said variable gain amplifier, said variable gain amplifier including means to receive the output from said differential amplifier means as a gain controlling input thereto, means for summing the output from said signal comparison means and said variable gain amplifier, the output from said means for summing being applied as a gain controlling input to said gain-controlled signal translating means.

4. A level control as defined in claim 3 wherein said gain-controlled signal translating means comprises a variable attenuator the attenuation of which is directly proportional to the output from said means for summing.

5. A level control as defined in claim 3 further comprising a unilateral conduction device through which said source of modulating signal is applied as said first input to said differential amplifier, said unilateral conduction device exhibiting an offset voltage characteristic corresponding to the threshold level intrinsic to said envelope detector.

6. An automatic level control by means of which an amplitude-modulated carrier signal may be independently controlled as to average peak carrier level and modulation index, comprising a first gain-controlled signal translating means through which said carrier signal is supplied to an output terminal, envelope detection means connected to said output terminal and developing an output signal corresponding to the modulation envelope of the signal applied thereto, first signal comparison means receiving the output from said envelope detector and a reference voltage the magnitude of which is set to equal a desired average peak carrier level, said first signal comparison means developing an output signal the average value of which is proportional to the percentage of time that the output from said envelope detector means exceeds said reference signal, second signal comparison means receiving the output from said envelope detector and a modulating signal source, said second signal comparison means developing an output signal corresponding to the instantaneous differential between said envelope detector output signal and said modulating signal source, a further variable gain signal translating means receiving said source of modulating signal, means applying the output from said second signal comparison means as a gain controlling second input to said further variable gain signal translating means, and means combining the outputs from said first comparator and said further variable gain signal translating means as a composite controlling input to said first gain-controlled signal translating means.

* * * * *